March 15, 1966 J. A. AMELOTTE 3,239,955
FILM CHIP EJECTOR AND TRANSPORT MEANS
Filed March 7, 1963
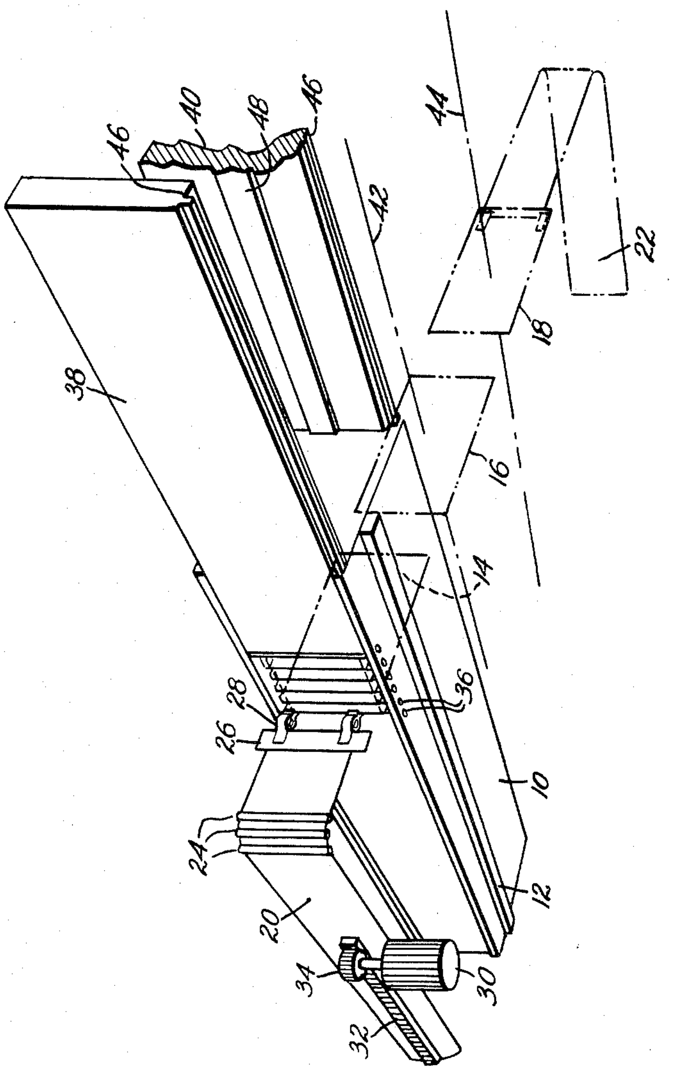
INVENTOR.
JOSEPH A. AMELOTTE
BY Stanley Belsky
ATTORNEY
Lawrence
AGENT United States Patent Office 3,239,955
Patented Mar. 15, 1966

3,239,955
FILM CHIP EJECTOR AND TRANSPORT MEANS

Joseph A. Amelotte, Danvers, Mass., assignor to Itek Corporation, Lexington, Mass., a corporation of Delaware Filed Mar. 7, 1963, Ser. No. 263,546
4 Claims. (Cl. 40—79)

This invention relates to film ejector and transport means for comparison or stereoscopic viewing devices and more specifically to a film ejector and transport means by which two film chips may be independently removed from their magazines and moved to positions approximately side by side, on a common plane, for purposes of either comparison or stereoscopic viewing by means of an appropriate dual viewer.

The parameters for a comparison or stereoscopic viewer require that the two information bearing film chips be disposed on the optical axes of each projection element. This places the chips approximately side by side with no intervening space suitable for transport mechanisms. This situation is most evident particularly in the case of the stereoscopic viewer, where the length of the chip is greater than the inter-pupillary distance. Since the center line of the entire unit falls midway between the projection units and the displayer film chips, side-ejecting film chip magazines must be established at positions outboard of the positions from which they are viewed.

Thus, the mandatory requirements of the standarized film magazines dictate this position relationship between the storage magazine and the operational position of the chip. The storage magazine must provide access to the film chip from either side and have an ejection device that makes contact with the chip from only one side. It must provide room for the mechanism which will transport the chips from their respective magazines in either direction. Because of the proximity of the optical axes, it is not possible for the film ejector-transport mechanism to lead either chip from its storage magazine, as the transport mechanism would then interfere with the adjacent optical path. It was, therefore, necessary to provide a film chip ejector which is capable of ejecting its chip by applying pressure to the trailing edge of the chip as it is moved toward its operating station.

Because it is essential for each chip to be completely displayed, it must, therefore, be completely removed from its magazine. As the only access to the chip is from the outboard side, as mentioned previously, the transport motivation must be a continuation of the ejection force, that is, it must push the chip from its storage slot to the viewing position.

It is, therefore, a principle object o fthe present invention to provide a transport mechanism for a comparison or stereoscopic viewer.

Another principle object of the present invention is to provide a transport mechanism for a comparison or stereoscopic viewer capable of aligning chips in side-by-side relation with no intervening space between the chips.

Still another principle object of the present invention is to provide a transport mechanism for a comparison or stereoscopic viewer wherein the transport mechanism is capable of removing the chips from a storage magazine, accurately indexing them in side-by-side relationship, with no intervening space, and thereafter returning them to their original places in the storage magazine.

A further principle object of the present invention is to provide a transport mechanism for a comparison or stereoscopic viewer which is capable of ejecting the film chip by applying pressure to the trailing edge and thereafter returning the chip to the magazine from whence it was removed.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing which is an isometric view of my novel ejector and transport means for independently removing and subsequently returning film chips.

While the description which hereinafter follows is directed to only a single magazine, it will be understood by those skilled in the art that two similar magazines are utilized for the proper operation of a stereoscopic or comparison viewer.

Referring now to the figure there is shown a magazine 10 having a drive rail 12 together with a suitable drive means (not shown) for properly indexing the magazine 10. The drive rail 12 may be a rack gear which, together with a motor driven pinion gear is one form of suitable indexing means. Rail 12 and an associated drive means indexes the magazine to a selected position so that my ejector and transport mechanism may select the appropriate film chip which in this case is indicated as 14.

Attached to the drive shaft of motor 30 is a pinion gear 34 which is meshed with rack gear 32. Rack gear 32 is in turn affixed to a flexible metal ribbon 20 as will hereinafter be described in detail. At the forward end of metal ribbon is a leading edge guide 26 in which is attached a pair of spring clip jaws 28. Roller guide means 24 provides a means by which the metal ribbon 20 is caused to turn about a corner and still provide the necessary positioning action so that jaws 28 may properly engage film chip 14. While no method of mounting rollers 24 have been indicated, it will be obvious to those skilled in the art that there are many different ways of mounting these rollers and hence any exegesis is unnecessary.

Magazine 10 is firmly fixed, and side movement is prevented by reason of the fact that the grooves of magazine 10. After the magazine has been properly indexed by 38 and 40. Tongue 48 of guide rail 40 mates with a side groove in magazine 10 to prevent any vertical movement.

Film chip 14 is shown in its stored position in magazine 10. After the magazine has been properly indexed by drive rail 12 and its associated drive means, motor 30 is energized so that rack 32 and pinion 34 drive ribbon 20 in a forward direction forcing jaws 28 to clamp onto the adjacent edge of film chip 14. Pinion 34 then continues to drive rack gear 32 and ribbon 20 until motor 30 is turned off. The motor 30 is de-energized only when film chip 14 has assumed the position indicated at 16. Similarly, metal ribbon 22 simultaneously drives the other film chip to the position indicated at 18. Film positions 16 and 18 are so chosen that the center of each film chip is normal to lines 42 and 44, respectively. Lines 42 and 44 represent the optical axes, separated by the inner-pupillary distance of the two viewing devices.

After viewing, studs may be inserted into appropriate ones of holes 36 so that when the selected film chip is brought back into the magazine by retracting jaws 28, the studs will prevent the film chip 14 from being pulled out of magazine 10.

One of the important elements of my ejector-transport device is the thin metal ribbons 20 and 22 which serve as the medium through which the motion is delivered to the chip and, after ejection, transports the chip back to the magazine 10. As a film chip is pushed through its storage slot toward the viewing positions, the metal ribbon 22 is accurately tracked behind the film chip because it travels in the same slots previously occupied by the now forerunning chip. In order to accomplish this, I have found that beryllium-copper is a satisfactory material from which the ribbons 20 and 22 may be fabricated. Because of the flexibility requirements, it has been found that the thickness of the ribbons may be less than 0.01 inch. This combination of metal and thickness provides excellent flexure while still maintaining the necessary stiffness.

To further assure stiffness as well as a high degree of straightness, the metal ribbon is formed with slight lateral curl, as indicated. This lateral curl provides the ribbon with sufficient section modulus to resist buckling during ejection and transportation of the chip. The curl is positioned to that the convex portion is on the outside at the point of bend induced by rollers 24. That is, where the thrust load is turned 90° into the plane of the displaced chips. As a result, the curl assures a thrust load force which is very low while also allowing the thrust force to be conducted around a corner.

At the point where the thrust load, as well as the return tensil load is turned around a 90° corner, there is a system of control rollers 24. The purpose of these rollers is twofold in that they reduce the friction at the point where the force bends the ribbon and also serves to control the ribbon at the bend, so that its line of direction may be accurately positioned in the grooves previously occupied by the film chip in the magazine.

It should be here mentioned that the rack gear 32 may be somewhat longer than the overall travel of the ribbon during its full excursion. It is thus possible to fix the rack gear to the ribbon over only a small part of its length, rearward of the leading edge guide 26. This allows the rack gear to be guided along its track while the ribbon peels away and travels around the turn in its prescribed path.

While I have described what is presently considered a preferred embodiment of my invention, it will be obvious to those skilled in the art that various changes and modifications may be made therein without departing from the inventive concept, and it is aimed in the appended claims to cover all such changes and modifications as fall within the true spirit and scope of my invention.

What is claimed is:

1. A data handling system for transporting a preselected medium of a plurality of planar data bearing media each having a first edge and a second opposed edge, comprising in combination:
  - support base means defining a viewing plane and a projection axis perpendicular to said viewing plane;
  - indexing carrier storage means adapted to receive and carry a magazine for storing said media in parallel spaced relation parallel to said viewing plane, said magazine having openings at two opposed sides thereof to expose said first edge and said second edge of said media, said carrier means including means for moving said magazine so that the plane of said preselected medium is substantially in said viewing plane and the first edge of said preselected medium is juxtaposed with said projection axis;
  - transport means including an elongated, flexible web having a leading edge, means for guiding said flexible web along a predetermined path having a rearward portion angularly disposed to said viewing plane and a forward portion substantially in said viewing plane and substantially perpendicular to said rearward portion;
  - means coupled to said leading edge for releasably engaging the second edge of said preselected medium;
  - reciprocal drive means for driving said flexible web with said engaging means in engagement with the second edge of said preselected medium along said predetermined path to urge said preselected medium from said magazine to a preselected position in said viewing plane to cause said preselected medium to intersect said projection axis and for thereafter driving said flexible web to retract said preselected medium along a portion of said predetermined path to return said preselected medium to said magazine.

2. A data handling system comprising in combination:
  - support base means defining first and second viewing plane portions, a first projection axis perpendicular to said first viewing plane portion and a second projection axis perpendicular to said second viewing plane portion;
  - a first plurality of planar data bearing media each having a first edge and a second opposed edge;
  - first storage means maintaining said first plurality of media in parallel spaced relation parallel to said first viewing plane portion, said first storage means including openings at two opposed sides thereof for exposing said first edge and said second edge of each of said first plurality of media;
  - a second plurality of planar data bearing media each having a first edge and a second opposed edge;
  - second storage means maintaining said second plurality of media in parallel spaced relation parallel to said second viewing plane portion, said second storage means including openings at two opposed sides thereof for exposing said first edge and said second edge of each of said second plurality of media;
  - means for indexing said first storage means and said second storage means so that the plane of a first preselected medium of said first plurality of media is substantially within said first viewing plane portion, and the plane of a second preselected medium of said second plurality of media is substantially within said second viewing plane portion and wherein the first exposed edge of said first preselected medium is juxtaposed with said first projection axis and said first exposed edge of said second preselected medium is juxtaposed with said second projection axis;
  - first transport means including a first elongated flexible web having a leading edge, means for guiding said first flexible web along a first predetermined path having a rearward portion angularly disposed to said first viewing plane portion and a forward portion substantially in said first viewing plane portion, and substantially perpendicular to said rearward portion, and first means coupled to said leading edge for releasably engaging the second edge of said first preselected medium;
  - second transport means including a second elongated flexible web having a leading edge, means for guiding said second flexible web along a second predetermined path having a rearward portion angularly disposed to said second viewing plane portion and a forward portion substantially in said second viewing plane portion and substantially perpendicular to said rearward portion, and second means coupled to said leading edge for releasably engaging the second edge of said second preselected medium; and
  - reciprocal drive means coupled to said first transport means and to said second transport means for driving said first web and said second web with said first engaging means in engagement with the second edge of said first preselected medium along said first predetermined path and said second engaging means in engagement with the second edge of said second preselected medium along said second predetermined path to urge said first preselected medium and said second preselected medium from their respective storage means each to a preselected position in said viewing plane portions to cause said first preselected medium to intersect said first projection axis and said second preselected medium to intersect said second projection axis and for thereafter driving said flexible webs to retract the preselected media along portions of the predetermined paths to return the preselected media to said first and second means.

3. The data handling system of claim 2 wherein said first storage means and said second storage means are magazines arranged in spaced parallel side by side relationship.

4. The data handling system of claim 3 wherein said first means and said second means are spring loaded clips.

References Cited by the Examiner

UNITED STATES PATENTS

| | | | |
|---|---|---|---|
| 2,460,359 | 2/1949 | Page | 129—16.1 X |
| 3,079,840 | 3/1963 | McMaster et al. | 40—79 X |

EUGENE R. CAPOZIO, *Primary Examiner.*

LAWRENCE CHARLES, JEROME SCHNALL, *Examiners.*

JOHN W. WILL, WILLIAM GRIEB, *Assistant Examiners.*